United States Patent
Yoder (10) Patent No.: US 11,867,335 B1
(45) Date of Patent: Jan. 9, 2024

(54) FLEXIBLE TAP TEE FITTING (71) Applicant: Central Plastic Products LLC, Shelbyville, IL (US)

(72) Inventor: Curtis A. Yoder, Shelbyville, IL (US)

( * ) Notice: Subject to any disclaimer, the term of this patent is extended or adjusted under 35 U.S.C. 154(b) by 704 days.

(21) Appl. No.: 16/440,542

(22) Filed: Jun. 13, 2019

Related U.S. Application Data (60) Provisional application No. 62/684,486, filed on Jun. 13, 2018.

(51) Int. Cl.
*F16L 47/28* (2006.01)
*F16L 47/18* (2006.01)

(52) U.S. Cl.
CPC .............. *F16L 47/28* (2013.01); *F16L 47/18* (2013.01)

(58) Field of Classification Search
CPC . F16L 47/28; F16L 47/18; F16L 37/48; F16L 37/0842; F16L 41/08; F16L 41/04; F16L 37/098; F16L 37/0985
USPC .......................................... 285/201–203, 222
See application file for complete search history.

(56) References Cited

U.S. PATENT DOCUMENTS

| | | | |
|---|---|---|---|
| 4,286,808 A | 9/1981 | Fouss | |
| 4,494,779 A * | 1/1985 | Neff | F16L 5/00 174/660 |
| 4,621,166 A * | 11/1986 | Neuroth | H02G 3/0691 174/660 |
| 4,836,580 A * | 6/1989 | Farrell | F16L 25/0045 285/24 |
| 6,328,349 B2 * | 12/2001 | Bandlow | F16L 37/0985 285/319 |
| 6,916,988 B1 * | 7/2005 | Auray | H02G 3/0691 174/665 |
| 9,528,645 B2 * | 12/2016 | Dankbaar | F16L 37/091 |
| 2008/0238087 A1 * | 10/2008 | Wang | F16L 37/0982 285/39 |
| 2012/0119485 A1 * | 5/2012 | Cichorek | F16L 37/0985 285/308 |
| 2012/0319401 A1 * | 12/2012 | Wang | F16L 37/0985 285/363 |
| 2014/0319823 A1 * | 10/2014 | Happich | F16L 37/098 285/309 |

FOREIGN PATENT DOCUMENTS

| | | | | |
|---|---|---|---|---|
| DE | 102010032694 B3 * | 2/2012 | ............. | B05B 1/202 |
| DE | 202016106327 U1 * | 11/2016 | ............. | F16L 47/28 |
| PL | 420693 A1 * | 9/2018 | ............. | F16L 37/144 |
| WO | WO-2014019757 A1 * | 2/2014 | .......... | F16L 37/0985 |

* cited by examiner

*Primary Examiner* — Matthew Troutman
*Assistant Examiner* — Fannie C Kee
(74) *Attorney, Agent, or Firm* — Grace J. Fishel (57) ABSTRACT

A flexible tap tee fitting for attaching a plastic drain pipe to a corrugated plastic drain pipe main of single-wall or double-wall construction. The tap tee fitting has a plurality of elongated tabs, some long and some short, with a circumferential ridge on the ends. The ridge biases the tabs inwardly as the tap tee fitting is pushed through a hole in the main and locks on the inside of main. The long elongated tabs engage the wall of a single-wall main and the short elongated tabs engage the wall of a double-wall main.

6 Claims, 8 Drawing Sheets

FLEXIBLE TAP TEE FITTING

BACKGROUND OF THE INVENTION

Field of the Invention

The present invention relates to a flexible tap tee fitting for attaching a plastic drain pipe to a corrugated plastic drain pipe main of single-wall or double-wall construction.

Brief Description of the Prior Art

Corrugated high-density polyethylene (HDPE) pipe is an excellent choice for gravity flow drainage systems. In such systems, a plurality of laterals may collect the water in a field and be connected to a header main at one end of the field. For this purpose the main corrugated pipe is drilled and a tap tee fitting installed for connection of each lateral. Conventional tap tee fittings make it very difficult to install a tap tee through a hole in the main because an installer must forcefully depress a securing ridge that runs around the tap tee with his fingers or a blunt object while trying to screw the tap tee through the hole.

There are several different types of corrugated drainage pipe. Most laterals are formed of 4" diameter corrugated single-wall pipe as is 6" and 8" diameter corrugated pipe typically. Single-wall corrugated pipe is not as strong but is suitable for field drainage and many other applications. Double-wall corrugated pipe typically measuring 10", 12" or 15" in diameter is used for the main header or other purposes. The double-wall corrugated pipe is still flexible but is more resistant to being crushed due to the double-wall construction. Double-wall corrugated pipe is smooth on the inside which increased flow capacity and corrugated on the outside. Because of the structural difference between single-wall and double-wall corrugated pipe, the requirements for a tap tee fitting also differ.

BRIEF SUMMARY OF THE INVENTION

In view of the above, it is an object of the present invention to provide a flexible tap tee fitting that is easily installed in a corrugated main with a "Push-to-Lock" motion. Other objects and features of the invention will be in part apparent and in part pointed out hereinafter.

In accordance with the invention, a flexible unitary plastic tap tee fitting for use in connecting a lateral plastic drain pipe to a corrugated plastic drain pipe main is provided. The tap tee fitting is formed with a tubular member having first and second ends and inner and outer walls. The first end of the tubular member is split at the first end into longer longitudinal tabs and shorter longitudinal tabs, said longer and shorter longitudinal tabs separated by longitudinal slots partially running the length of the tubular member. Each of the tabs has a circumferential ridge at the first end, said ridge having an outer face canted towards the first end. The tubular member has at least one outwardly facing reinforcement rib below the longitudinal slots in the outer wall to prevent crushing the fitting in use when attached to a coupler for the lateral plastic drain.

As illustrated the longer longitudinal tabs are narrower than the shorter longitudinal tabs and a plurality of longer longitudinal tabs are grouped and separated by diametrically opposed shorter longitudinal tabs. In some embodiments, at least one cavity is formed in the outer face of the ridge on each of the longer longitudinal tabs. In other embodiments, the shorter longitudinal tabs are chamfered at the first end and the ridge extends between the chamfers.

In some cases, at least one longitudinal reinforcement rib is provided on the inner wall for each of the longer longitudinal tabs. In others, at least one longitudinal reinforcement rib is provided on the inner or outer wall for each of the shorter longitudinal tabs.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Referring to the drawings more particularly by reference character, reference numeral 10 refers to a long-neck tap tee fitting as shown in FIGS. 1-3 and 7 and reference numeral 12 refers to a short-neck tap tee fitting as shown in FIGS. 4-6 and 8. Tap tee fittings 10, 12 are formed of a comparatively soft resin such as polyethylene or polypropylene. However, other resins with an appropriate amount of elasticity may also be used. In general, short-neck tap tee fitting 12 is used with a 6" or 8" diameter corrugated pipe and long-neck tap tee fitting 10 is used with a 10", 12" or 15" diameter corrugated pipe.

As shown in FIGS. 1-6, tap tee fittings 10, 12 are tubular members 14 having an imaginary central axis 16, inner and an outer walls 18, 20 respectively, and first and second ends 22, 24, respectively. Tubular member 14 is split at first end 22 into a plurality of longitudinal tabs separated by longitudinal slots 26 partially running the length of tubular member 14. Longitudinal tabs are divided into long tabs 28L and short tabs 28S. In the form illustrated, long tabs 28L are narrower than short tabs 28S and a plurality of longs tabs 28L (shown as three) is separated by diametrically opposed short tabs 28S.

Figure 3:
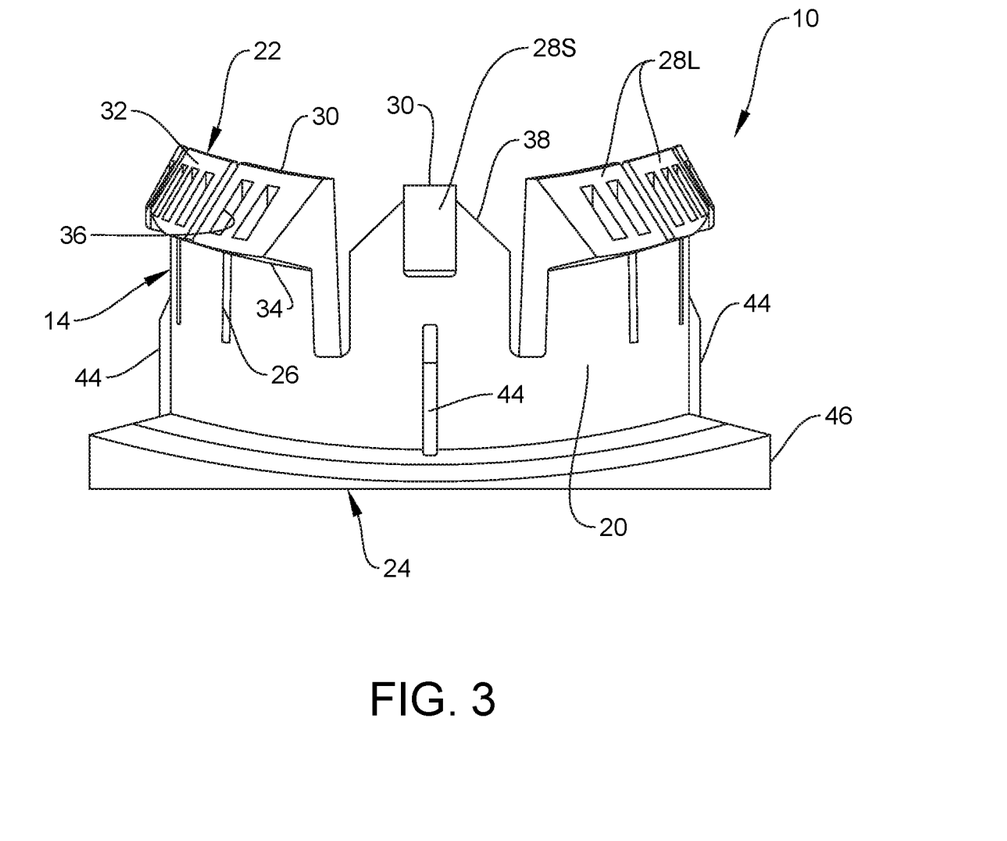
FIG. 3 is a side elevation of the long-neck tap tee fitting.
Figure 6:
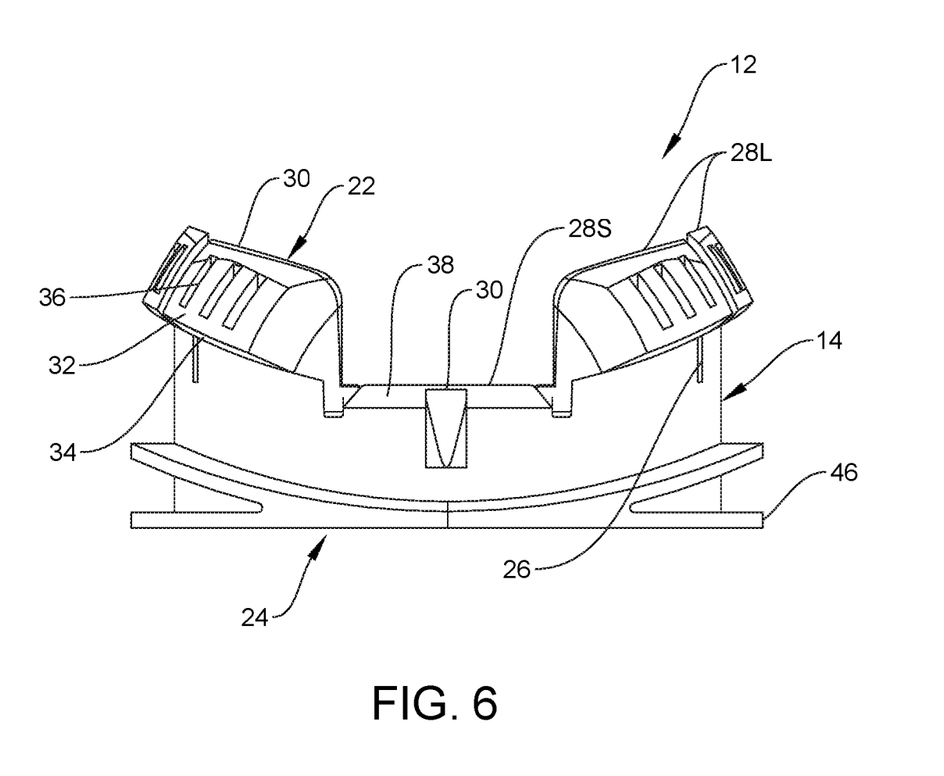
FIG. 6 is a side elevation of the short-neck tee fitting.

Each of long tabs 28L and short tabs 28S has a ridge 30 best seen in FIGS. 3 and 6 at first end 22. Ridge 30 has an outer face 32 that is canted toward first end 22 and a bottom edge 34 that is preferably generally flat. As illustrated bottom edge 34 is perpendicular to imaginary central axis 16 and outer face 32 is also flat. As such, ridge 30 radially protrudes beyond outer wall 20 of tubular member 14. A ridge 30 with other than a right angle triangular configuration, such as semicircular or other regular and irregular configurations, may be used so long as a portion of it cants towards first end 22 and a bottom wall provides an abutment surface as discussed below.

The construction of long tabs 28L in long-neck and short-neck fitting taps 10, 12 is similar. Ridge 30 in each of tabs 28L has one or more cavities 36 formed in outer face 32. Cavities 36 conserve on the amount of plastic needed to mold the product and make ridge 30 more flexible. The construction of short tabs 28S in both long-neck and short-neck fitting 10, 12 is similar. Ridge 30 is chamfered 38 leaving a short segment of ridge 30. Chamfers 38 facilitate passage of fitting taps 10, 12 through a hole in the sidewall of a main 42 easier as shown in FIGS. 9 and 10.

Longitudinal reinforcement ribs 44, which act as a ferrule, are provided on inner wall 18 of tubular member 14 beginning at or near second end 24 and terminating below first end 22. Longitudinal reinforcement ribs 44 centered behind long tabs 28L. Other longitudinal reinforcement ribs 44 are provided on outer wall 20 centered on short ribs 28S, a feature which may or may not be present in short-neck fitting tab 12 or other embodiments.

Figure 1:
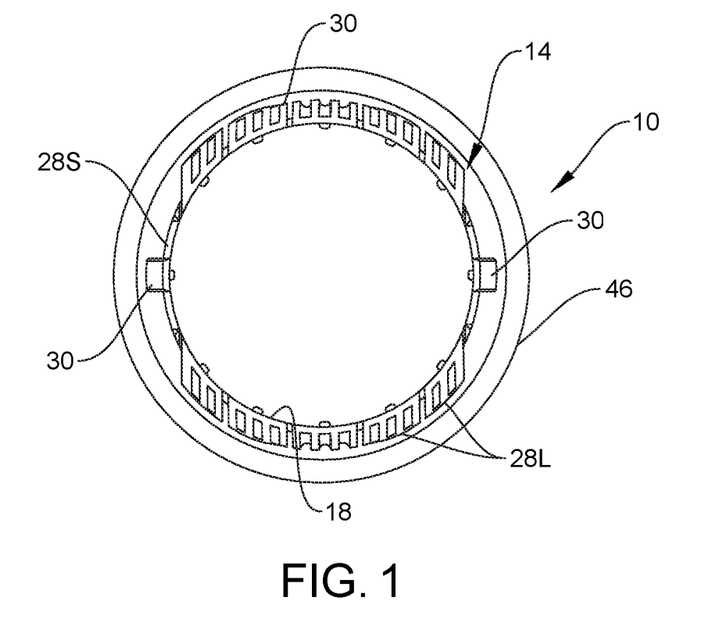
FIG. 1 is top plan view of a long-neck tap tee fitting in accordance with the present invention for use in installing a lateral into a 10", 12" and 15" diameter corrugated main.
Figure 2:
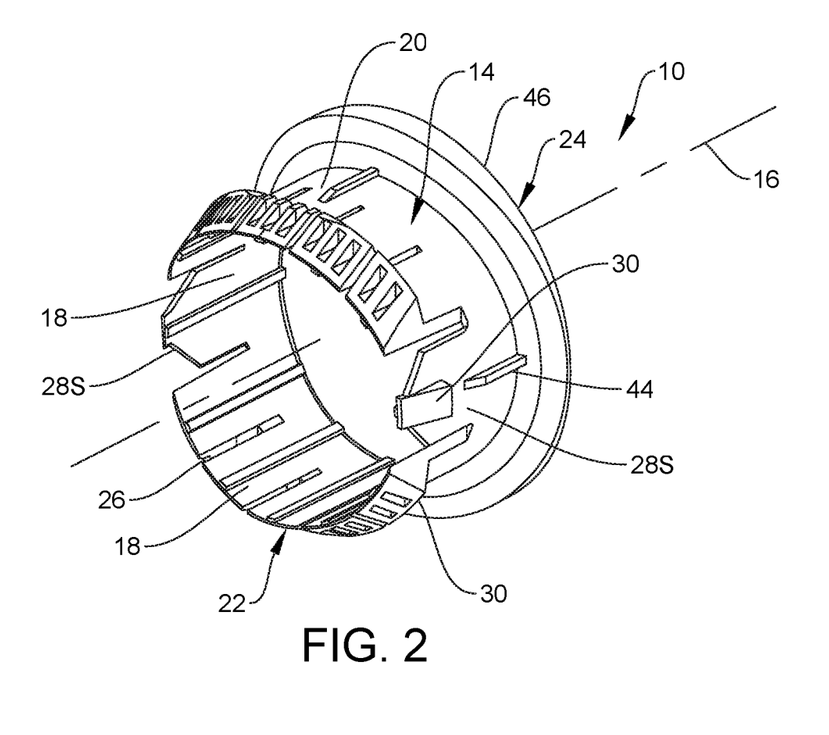
FIG. 2 is a perspective view of the long-neck tap tee fitting viewed from an end inserted into a hole in the main.
Figure 4:
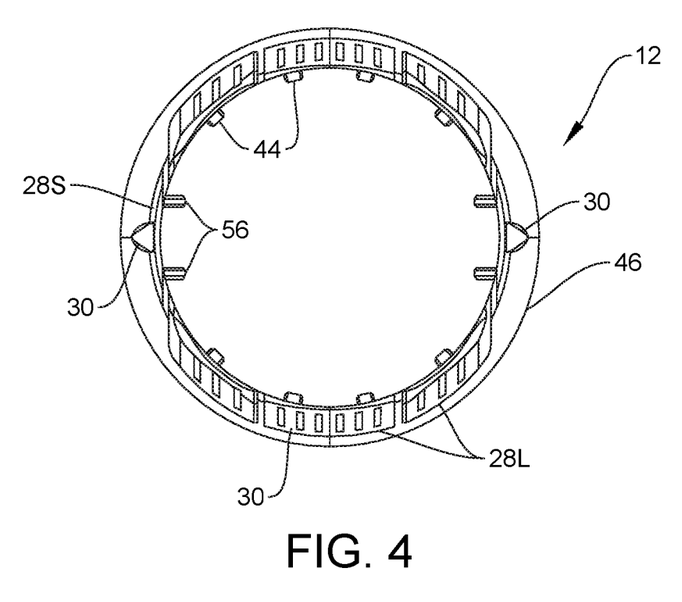
FIG. 4 is a top view of a short-neck tap tee fitting in accordance with the present invention for use in installing a lateral into a 6" or 8" diameter corrugated main.
Figure 5:
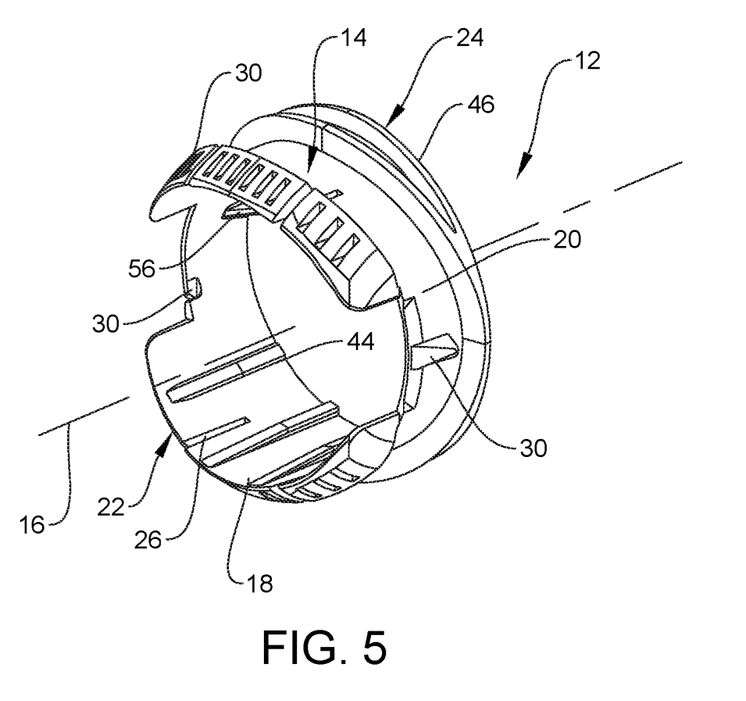
FIG. 5 is a perspective view of the short-neck tee fitting viewed from an end inserted into a hole in the main.

Tubular member 14 has at least one curved reinforcement rib 46 encircling outer wall 20 adjacent second end 24 which effectively thickens tubular member 14 at second end 24 and acts as a ferrule. One such rib 46 is shown in FIGS. 1-3 with long-neck tap tee fitting 10 and two are shown in FIGS. 4-6 with short-neck tap tee fitting 12. Curved reinforcement ribs 46 reinforce tubular member 14 such that it does not crush under a back fill of dirt or rock.

Figure 9:
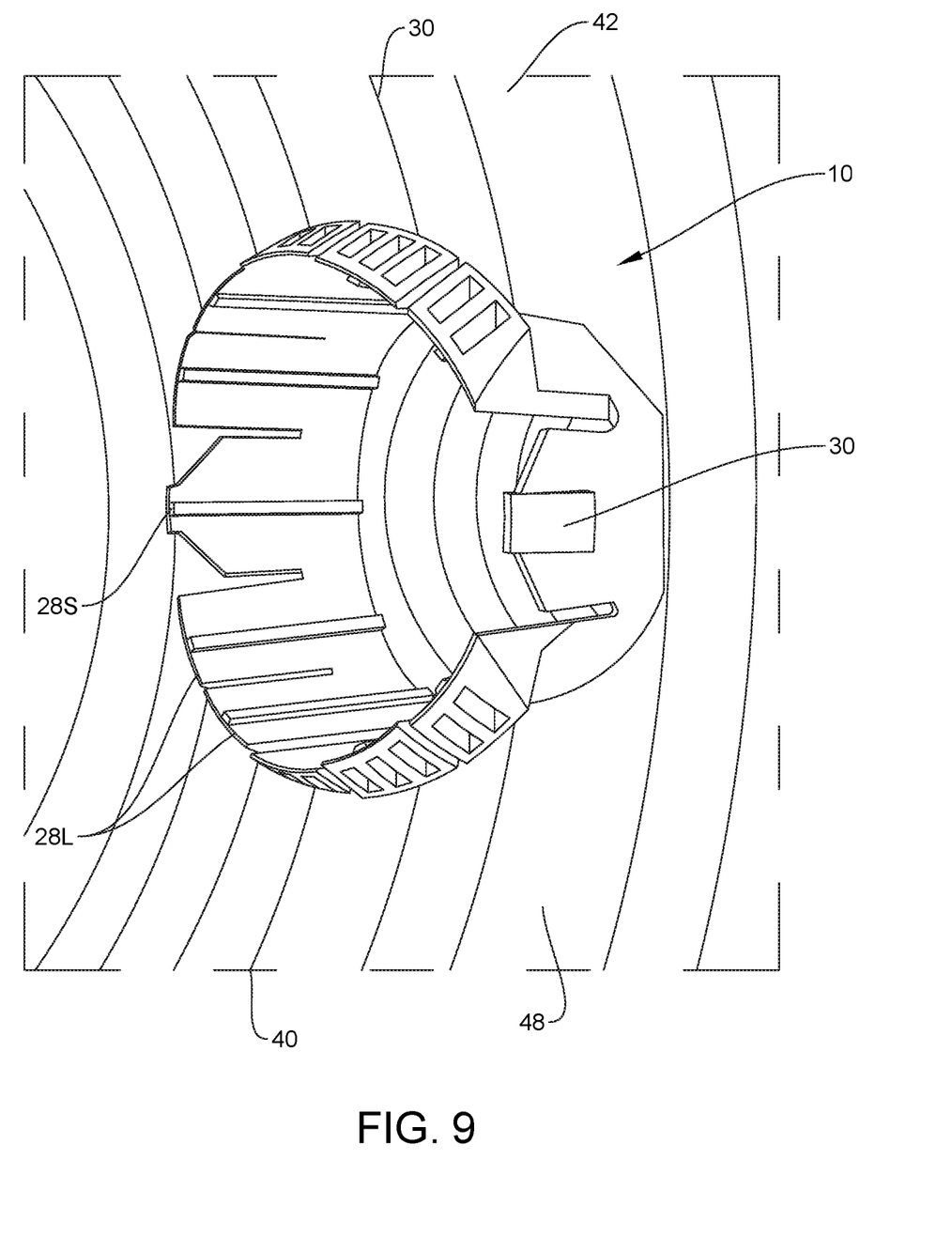
FIG. 9 is a photograph of a long-neck tap tee fitting installed in a single-wall corrugated main; and, FIG. 10 is a photograph of a long-neck tap tee fitting installed in a double-wall corrugated main.
Figure 10:
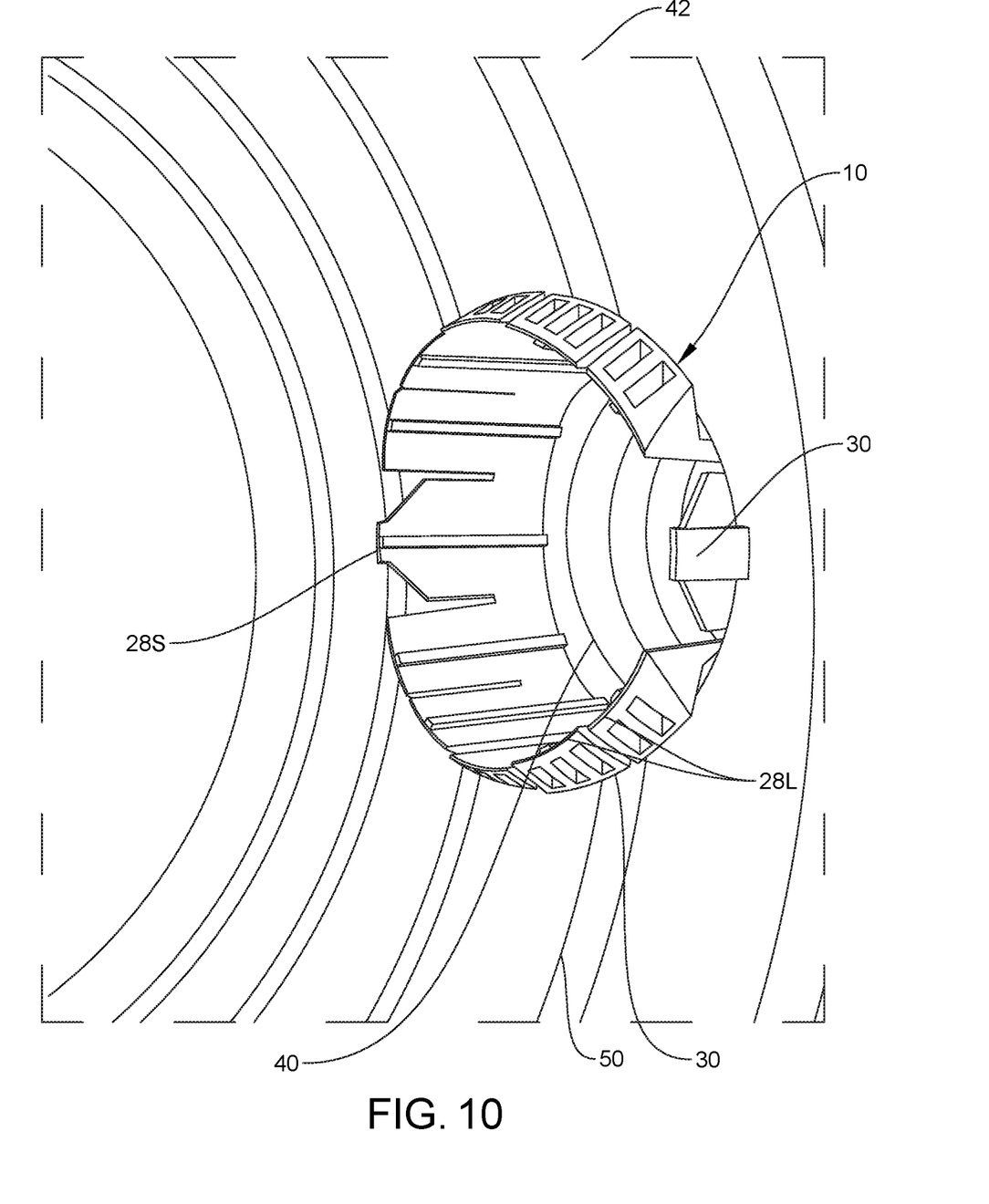

In use, hole 40 seen in FIG. 9, is drilled in single-wall corrugated main 42 and first end 22 of fitting tap tee 10 or 12 is pushed through the hole. Ridge 30 which is canted towards first end 22 elastically pushes short tabs 28S inwardly allowing the ridge to pass through hole easily and lock on an inner wall 48 of single-wall main adjacent hole 40. As shown in FIG. 10, hole 40 is drilled in a double-wall corrugated main 42. As fitting tap tee 10, 12 is pushed through hole 40 ridge 30 on long tabs 28L is first elastically deflected inwardly, followed by short segment of ridge 30 on short tabs 28S which then locks on the smooth inner lining 50 of the double-wall main. In both instance, installation is an automatic "Push-to-Lock" operation that easily secures tee fitting 10 or 12 inside the single-wall or double-wall main.

Figure 7:
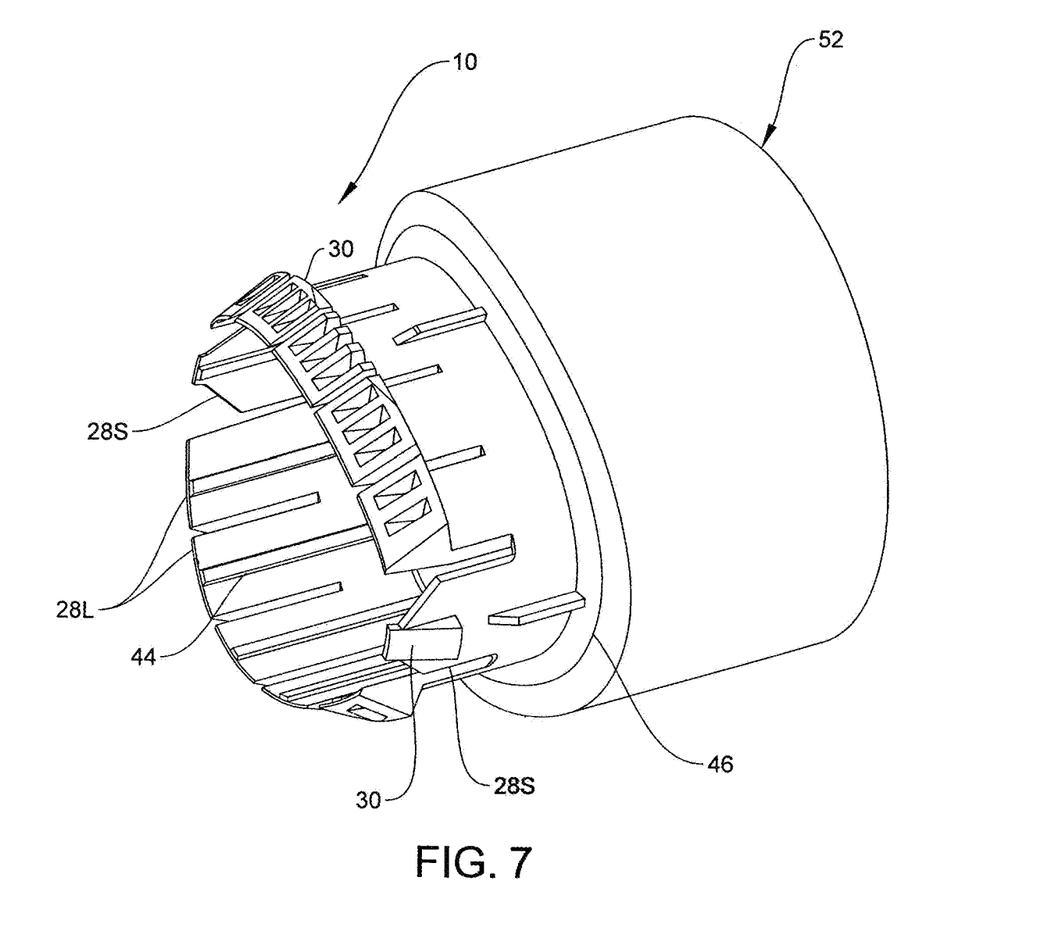
FIG. 7 is a perspective view of a long-neck tap tee fitting installed on a connector to the lateral.
Figure 8:
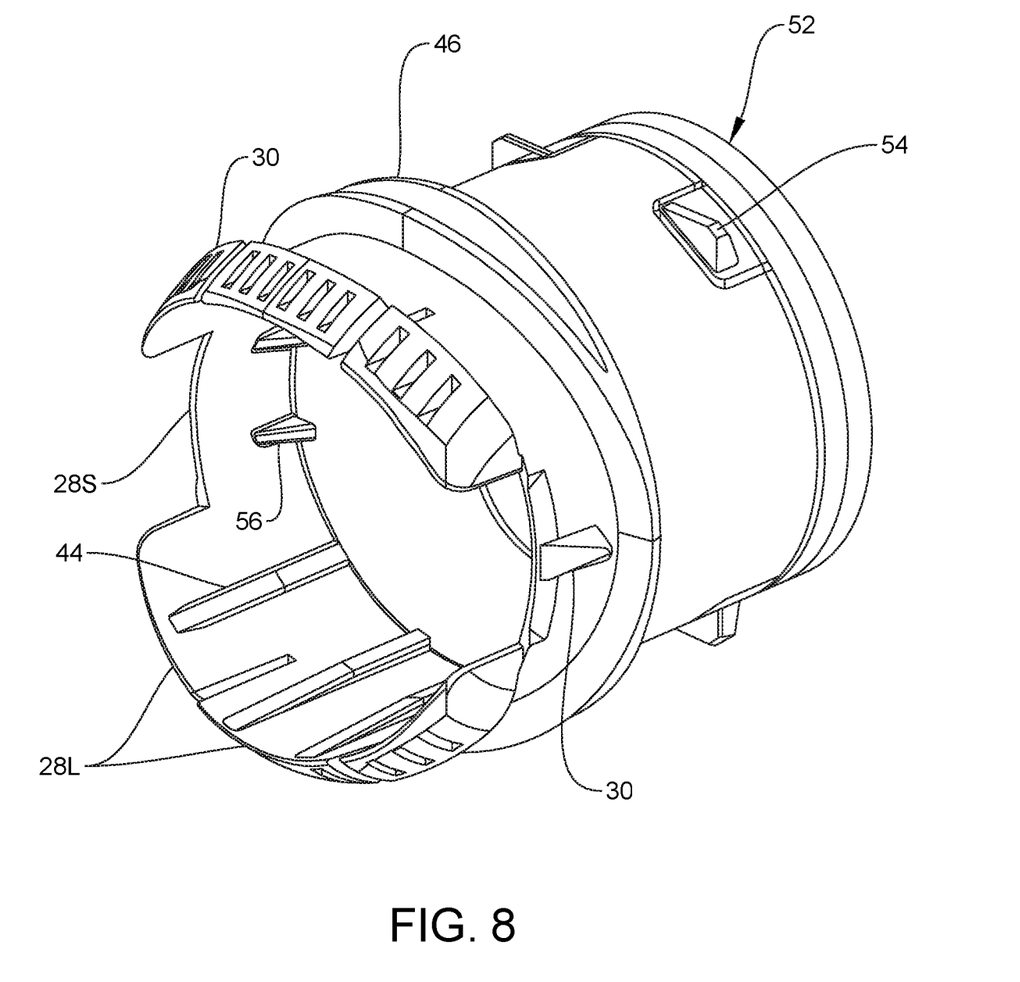
FIG. 8 is a perspective view of a short-neck tap tee fitting installed on a connector to the lateral.

For connection to a lateral plastic pipe, tap tee fitting 10, 12 is attached to a coupling 52. Coupling 52 may be molded as an integral portion of tap tee fitting 10, 12 or otherwise integrated. Coupling 52 may act as an internal coupler backing or an external coupler backer. A smaller diameter lateral drain pipe (not shown) may be slipped inside coupling 52 and locked with a spring biased latch 54 or slipped over coupling 52 and latched. Stops 56 may be provided at second end 24 of tubular member 14 to prevent over inserting a lateral into short-neck tap tee fitting 12.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A flexible unitary plastic tap tee fitting for use in connecting a lateral plastic drain pipe to a corrugated plastic drain pipe main, said tap tee fitting comprising
    a tubular member having first and second ends and inner and outer walls, said first end of the tubular member split at the first end into first and second diametrically opposed curved rows of longer longitudinal tabs wherein the longer longitudinal tabs in each row are shorter at a first and a second end of each row separated by first and second diametrically opposed single shorter longitudinal tabs, said longer longitudinal tabs separated by longitudinal slots partially running a length of the tubular member,
    each of said longer longitudinal tabs in said first and second diametrically opposed curved rows of longer longitudinal tabs having a circumferential ridge on the outer wall at the first end of the tubular member, said ridge having an outer face canted outwardly towards the second end of the tubular member, said ridge having a plurality of outwardly facing cavities, and
    said tubular member having at least one outwardly facing reinforcement rib below the longitudinal slots in the outer wall.

2. The tap tee fitting of claim 1 wherein the first and second diametrically opposed curved rows of longer longitudinal tabs are chamfered at a the first and second end of the rows.

3. A flexible unitary plastic tap tee fitting for use in connecting a lateral plastic drain pipe to a corrugated plastic drain pipe main, said tap tee fitting comprising
    a tubular member having first and second ends and inner and outer walls,
    said first end of the tubular member split at the first end into first and second diametrically opposed curved rows of longer longitudinal tabs wherein the tabs in each row are shorter at a first and a second end of each row separated by first and second diametrically opposed single shorter longitudinal tabs, said longer longitudinal tabs separated by longitudinal slots partially running a length of the tubular member,
    each of said longer longitudinal tabs having a longitudinal reinforcing rib on the inner wall and a circumferential ridge on the outer wall at the first end of the tubular member, said ridge having an outer face canted outwardly towards the second end of the tubular member and having a plurality of outwardly facing cavities,
    said tubular member having at least one outwardly facing curved reinforcement rib below the longitudinal slots in the outer wall, and
    said second end of the tubular member configured for attachment to a coupler for the lateral plastic drain pipe.

4. The tap tee fitting of claim 3 wherein the outer face of each ridge is flat.

5. The tap tee fitting of claim 4 wherein the shorter longitudinal tabs are chambered.

6. The tap tee fitting of claim 5 wherein at least one longitudinal reinforcement rib is provided on the inner or outer wall for each of the shorter longitudinal tabs.

\* \* \* \* \*